United States Patent Office 3,140,529
Patented July 14, 1964

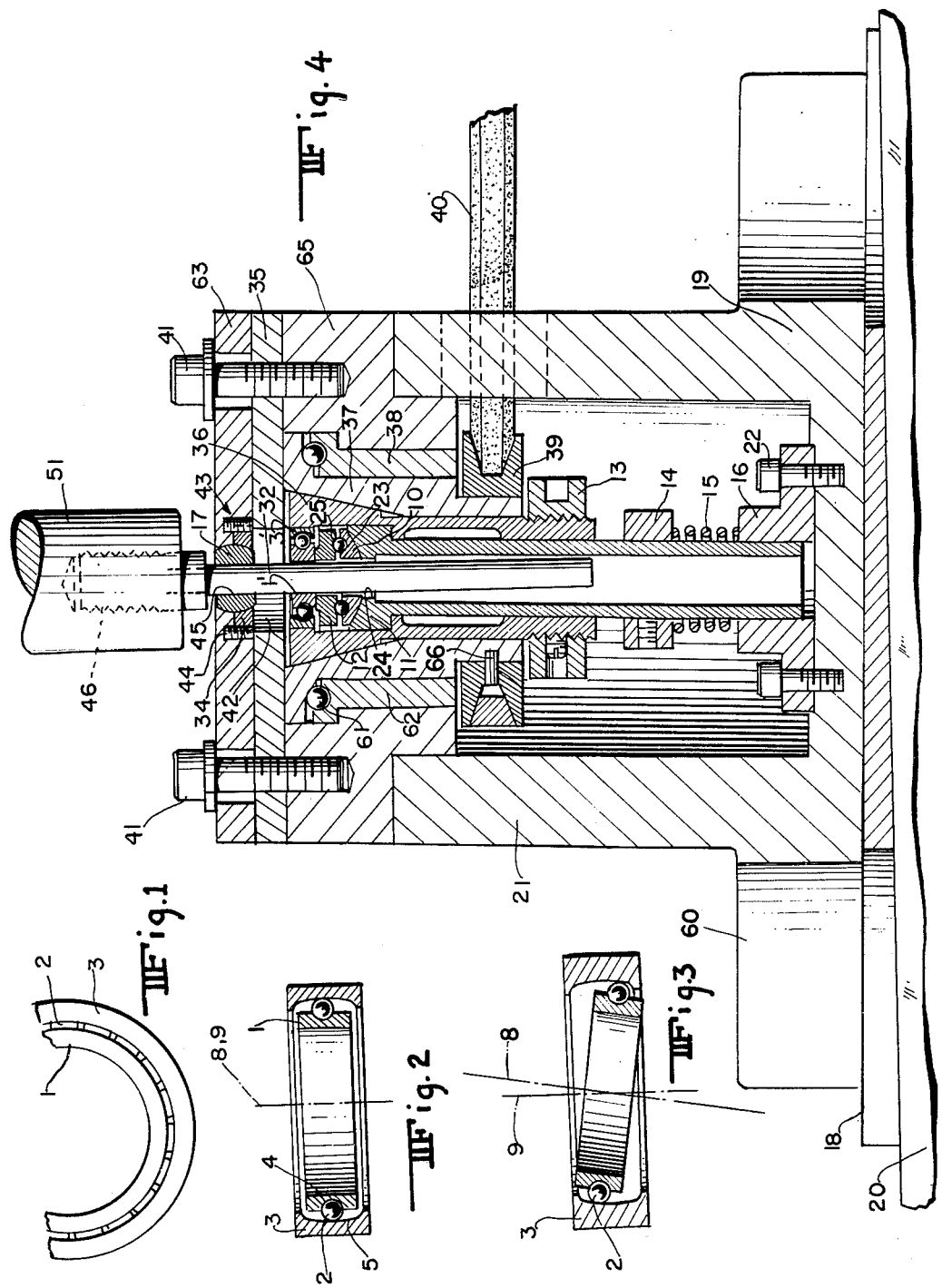

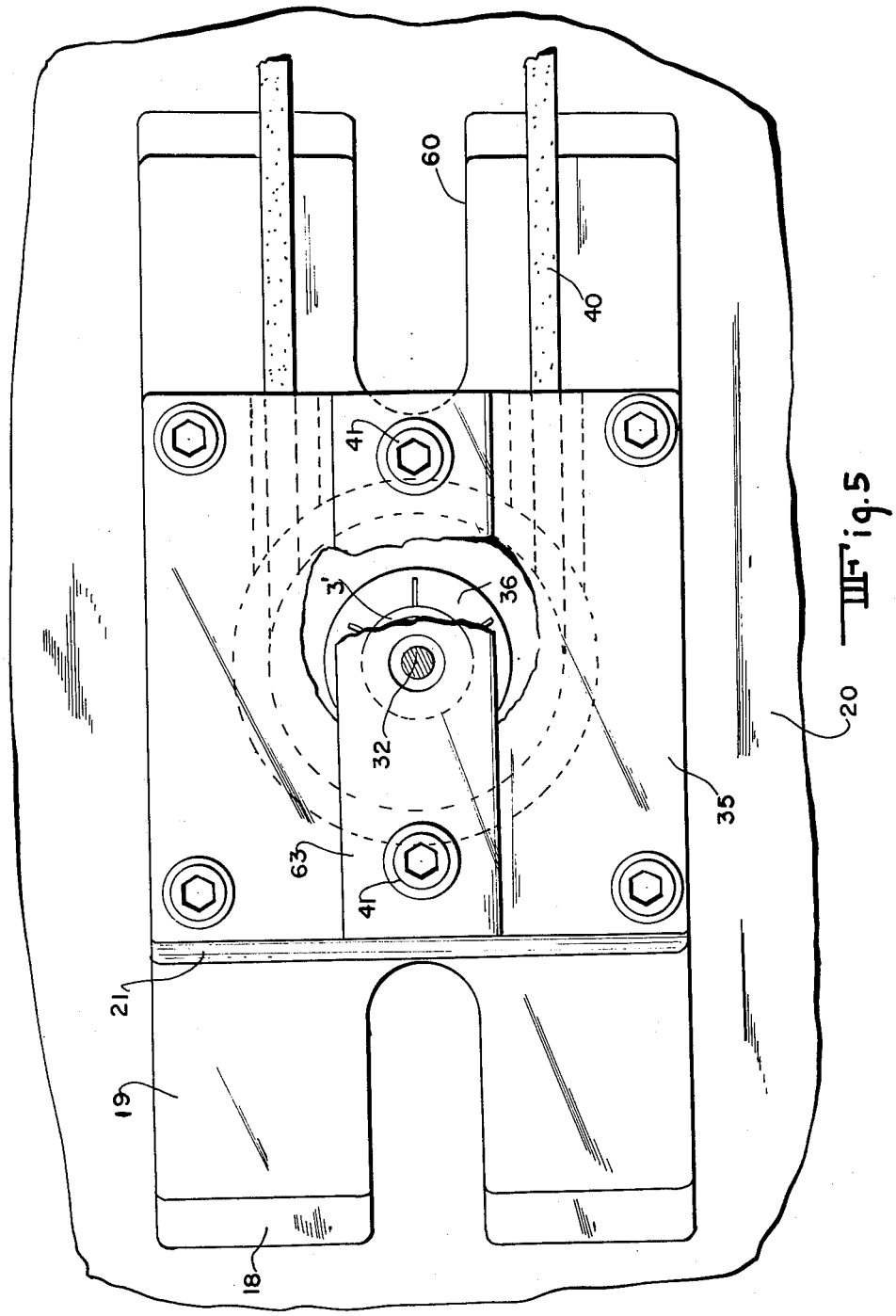

3,140,529
METHOD AND APPARATUS FOR MANUFACTURING BEARINGS
Alfreds Rozentals, Fairfield, Conn., assignor, by mesne assignments, to The Heim Universal Corporation, a corporation of Delaware
Filed Nov. 22, 1961, Ser. No. 154,237
4 Claims. (Cl. 29—90)

The present invention relates to the mechanical manufacture of bearings and more particularly to apparatus and methods for producing self-aligning bearings.

A type of self-aligning ball bearing in wide-spread use consists of an inner race and an outer race with the outer race having a raceway of relatively large dimension in the axial direction, and a plurality of rolling elements between the races. It is an objective of the present invention to produce self-aligning ball bearings of this type and having a unitary outer race and work-hardened burnished raceways. It is a further objective that such production be economical, readily and accurately controlled, and adapted to changes in the sizes of bearings produced.

In accordance with the present invention rolling elements are rotated over a race with the axis of their rotation being at an acute angle to the axis of the race. Such rotation brings the rolling elements into even contact with the entire axially elongated surface of the race.

FIG. 1 is a top plan view of the bearing produced by the apparatus and method of the present invention;

FIG. 2 is a side cut-away view of the bearing of FIG. 1 in which the axis of the load is on the same axis as the outer race;

FIG. 3 is a side cut-away view of the bearing of FIG. 1 with the axis of the load at an angle to the axis of the outer race;

FIG. 4 is a side view of the apparatus of this invention; and

FIG. 5 is a top view of the apparatus of FIG. 4.

In FIG. 1 the bearing produced by the apparatus and method of the present invention is shown with inner race 1, rolling members 2 (shown as spherical balls), and outer race 3. In FIG. 2, a side view of the same bearing as in FIG. 1, the radius of curvature of raceway 4 of the inner race 1 is slightly larger than that of the rolling elements 2. In contrast, the raceway 5 of outer race 3 is considerably elongated in the axial direction. Except for elongated raceway 5, the bearings produced by this invention are the same as the conventional type of bearing having inner and outer races and rolling elements between them. Elongated raceway 5 permits the axis of inner race 1 to make angular adjustments relative to the axis 9 of outer race 3.

In FIG. 3, the axis 8 of a load is at an angle relative to axis 9 of outer race 3. The inner race 1 swivels within the outer race 3 so that on one side of the outer race the rolling elements rotate below the equator of the outer raceway 5 while on the opposite side of the outer race the rolling elements rotate above the equator of raceway 5.

FIGS. 4 and 5 show the apparatus of the present invention. In FIG. 4, lower working base 20 is a table, bolster plate, or other generally horizontal working surface. Wedge 18 is positioned at the top of base 20. The wedge determines the degree of self-alignment of the finished bearing and may be readily changed by lifting the apparatus off the base 20 and replacing wedge 18 with a differently angled wedge.

On top of wedge 18 is base member 19 which has circular indentations 60. Vertical support member 21 is integral with and a part of the base member 19. Annular ring-like support member 16 is secured to the base member 19 at its bottom by bolts 22.

Vertical tube 11 is secured within the cavity formed by member 16. The inner wall of tube 11 is of substantially even circumference for its entire length. At the top of tube 11 is a cuplike portion 23 having circular opening 24 through it. Tube 11 can move vertically a short distance, being held upward by spring 15 acting against collar 14 which is secured to tube 11.

A self-aligning stationary lower race 10 swivels within the cup 23 of member 11, with cup-like portion 23 and race 10 acting similar to a ball and socket connection. Upper race 12, which rotates through contact with the inner race 1' of the bearing being produced, is on top of lower race 10 and separated from it by spherical balls 25. Split collet 36 abuts against the outer race 3' of the bearing being produced and surrounds the upper portion of tube 11. Collet 36 is held by collet holder 37 which is connected by screw 66 to pulley 39. Pulley 39 is driven by belt 40 from a motor (not shown) whose speed is readily adjustable. Collet holder 37 rotates relative to support member 62 on bearing 61. Member 62 is fixedly attached to vertical support 21 by support member 65.

The spacer 35 and the stripper plate 63 are secured to support member 65 by bolts 41. Stripper plate 63 has in its center a circular opening 42 in which is mounted a self-aligning spherical bearing designated generally at 43. Bearing 43 consists of mounting member 44 which attaches it to plate 63, outer race 34 and inner spherical ball 17 having shaftway 45.

Tapered punch 32 protrudes through the shaftway 45 of ball 17, through the shaftway of the bearing being produced and through the openings in races 12 and 10 and opening 24. Punch 32 is secured so that upon rotation it will not abut against the inner wall of tube 11. In rotation, and with wedge 18 in position, the axis of rotation of plunger 32 is at an angle relative to the axis of tube 11.

Punch head securing means 46 is integral with punch 32 and is itself removably secured to the bottom of ram 51. Ram 51 is rotated, preferably in the direction counter to that of pulley 39, by a motor (not shown). Ram 51 also moves vertically relative to wedge 18 in a controlled manner.

In operation, starting with ram 51 in its raised position, a wedge 18 having a selected angle is placed on base 20 to give the required degree of self-alignment to the bearing to be produced. The punch 32 is then inserted through shaftway 45 in bearing 43 so that ball 17 misaligns (relative to base 20) to compensate for the non-vertical alignment of support member 21. The split collet 36 is in its raised and open position permitting insertion of a ball bearing in its cavity with race 1' resting on upper race 12.

The raceway in the outer race is elongated by machining in the axial direction, before processing on this apparatus, and it is the apparatus of the present invention which burnishes and finishes the elongated race.

Ram 51 then descends forcing punch 32 into the shaftway of race 1'. Punch 32 drives the ball bearing, collet 36, upper race 12, lower race 10, and tube 11 downwardly causing collet 36 to contract due to the inward taper of collet-holder 37. Because of the taper of punch 32, the relation of the punch to the shaftway of inner race 1' is such that in certain embodiments the punch wedgingly engages the shaftway of race 1 and forces race 1 against the seating surface of support race 12 to thus provide axial as well as rotational force.

The ram 51 and the inner race 1' are then rotated. The outer race 3', collet 36 and collet holder 37, which are locked together, are rotated in the opposite direction by belt 40 driving pulley 39.

After race 1' has been sized by the rotation and race 3' elongated and burnished, using the rolling elements as sizing and burnishing means, ram 51 is raised. Spring 15 expands forcing collar 14 upward which causes tube 11 to rise. Tube 11 pushes upward on lower race 10, upper race 12, and collet 36 causing collet 36 to open and release the bearing. Collar 14 is stopped in its upward motion by the bottom of collet holder 36. Punch 32 carries the now burnished bearing up with it to spacer 35. The bearing is stripped from punch 32 by plate 63.

I claim:

1. Apparatus for the sizing and burnishing of self-aligning ball bearings comprising a base, an angular wedge on the base, an upright support member on the wedge, a self-aligning bearing secured to the top of the support member, a bearing holding member for removably holding the race to be burnished, a plunger which rotates and moves along the axis of the holding member and means to rotate and move axially the plunger, in which the plunger is adapted to rotate rolling elements and move them axially.

2. Apparatus as in claim 1 to burnish an assembled bearing having an inner race with a shaftway, outer races, and rolling elements between the races, wherein the holding member is adapted to fit the shaftway of the inner race, whereby the rotated rolling elements are the rolling elements between the races.

3. Apparatus as in claim 2 and including means to rotate the holding member in the direction opposite to the rotation of the plunger.

4. Apparatus for the burnishing of a bearing comprising inner and outer races with a plurality of rolling elements between the races, one of which races is elongated in the axial direction, the apparatus comprising a base, an upright bearing holding member to hold releasably the outer race of the bearing being burnished, a plunger which moves relative to the holding member along an axis which is at an acute angle to the holding member, the plunger being adapted to be releasably secured in the shaftway of the inner race, and means to rotate one of the races of the bearing relative to the other race.

References Cited in the file of this patent

UNITED STATES PATENTS

| | | |
|---|---|---|
| 2,913,810 | Heim | Nov. 24, 1959 |
| 2,998,636 | Spence | Sept. 5, 1961 |